United States Patent [19]

O'Neill

[11] 4,032,718

[45] June 28, 1977

[54] FOUR-WIRE INTEGRABLE HYBRID

[75] Inventor: John Francis O'Neill, Boulder, Colo.

[73] Assignee: Bell Telephone Laboratories, Incorporated, Murray Hill, N.J.

[22] Filed: May 19, 1976

[21] Appl. No.: 687,622

[52] U.S. Cl. .................... 179/15 AA; 179/170 NC
[51] Int. Cl.² ........................................ H04J 3/02
[58] Field of Search ....... 179/15 A, 15 AA, 15 AQ, 179/15 AT, 18 BC, 170 NC

[56] References Cited

UNITED STATES PATENTS

| | | | |
|---|---|---|---|
| 2,936,337 | 5/1960 | Lewis | 179/15 AA |
| 3,366,738 | 1/1968 | Feder | 179/15 AA |
| 3,668,318 | 6/1972 | Becker | 179/15 AA |

OTHER PUBLICATIONS

*Telecommunications Transmission Engineering,* AT & T, 1974, "Elements of Transmission Analysis: Four— Terminal Linear Networks," vol. 1, Chapter 4–5, pp. 106–109.

*Transmission Systems for Communications,* Bell Telephone Laboratories, Inc., 1970, "Digital Terminals: Coding," Chapter 25.2, Fourth Edition, pp. 570–571.

*Primary Examiner*—William C. Cooper
*Assistant Examiner*—Joseph Popek
*Attorney, Agent, or Firm*—Howard R. Popper

[57] ABSTRACT

A time-sampled port circuit is shown in which the charges impressed by the telephone set on the shunt capacitor of a low-pass filter associated with the port are passively sampled for transmission to the other port circuits, but which capacitor is impulse driven at a repetition rate equal to twice the cut off frequency of the filter with speech samples received from the other port circuits. By employing passive sampling in the transmitting leg instead of actual charge transfer, as in conventional resonant transfer design, the series inductor normally required in resonant transfer circuits may be omitted with the result that the port circuit switches may be integrated on one chip together with the digital circuitry for encoding and decoding the amplitude samples. Further, all need for amplifier gain adjustment in the port circuit is eliminated by applying different amplitude send and receive ramp signals to the encoder and decoder circuits. Transmission delay in a time division system employing the port circuit is compensated by delaying the onset of the receive ramp waveform.

13 Claims, 6 Drawing Figures

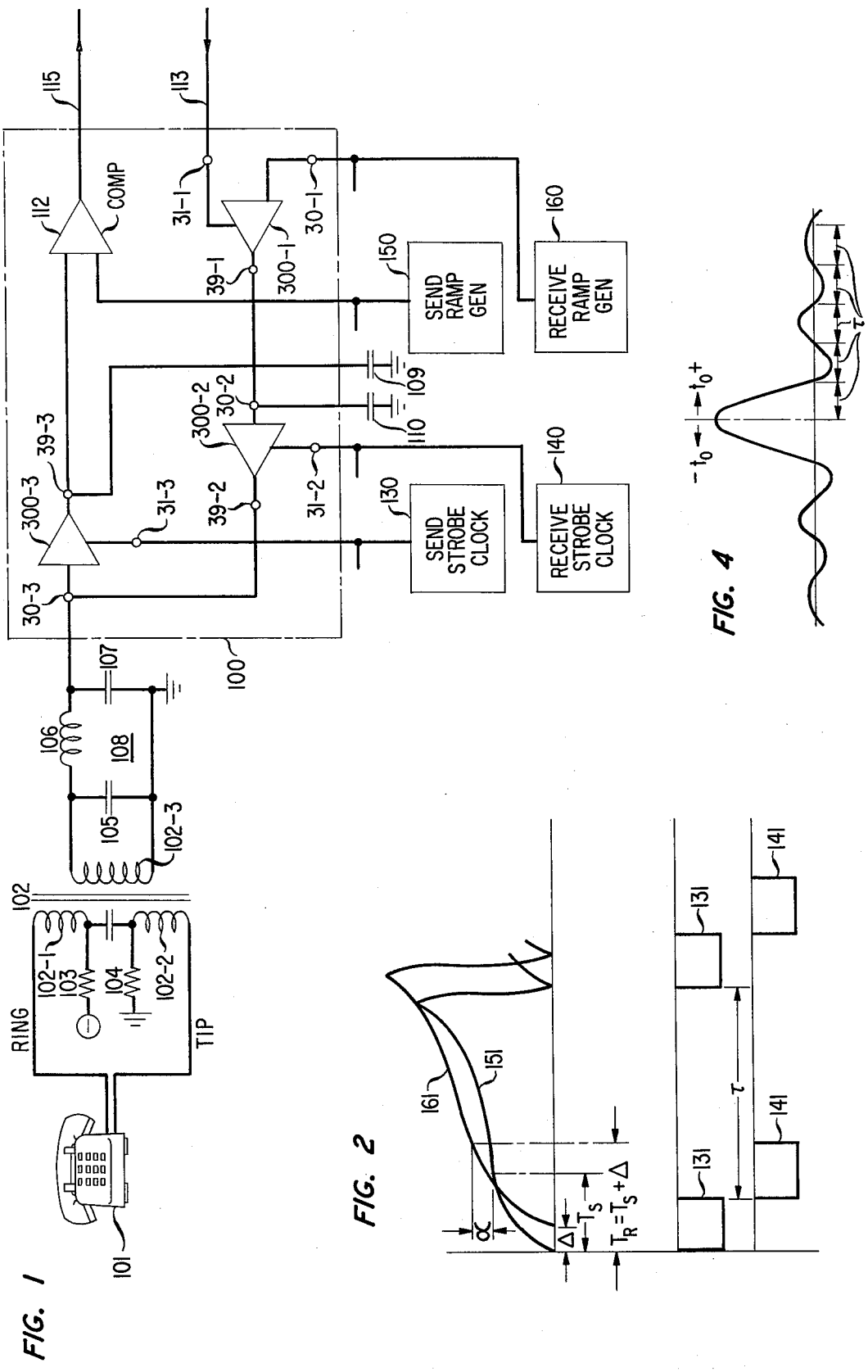

FOUR-WIRE INTEGRABLE HYBRID

BACKGROUND OF THE INVENTION

This invention relates to time-sampled or time division switching circuits.

Time division switching is based on the principle that a continuously varying information signal may be faithfully reproduced if its amplitude is sampled at least twice as often as the highest frequency variation desired to be conveyed. If a great many information signals are to be sampled, each requiring the same minimum sampling rate for faithful reproduction, the duration of each sample, and hence its energy content, will be quite small. Effective communication thus demands that the energy content of each sample be efficiently utilized.

One technique which ensures that the energy in a speech sample will be efficiently utilized employs resonant transfer circuitry disclosed, for example in W. D. Lewis U.S. Pat. No. 2,936,337 issued May 10, 1960. Each port circuit appearing in the time division switching system of the Lewis patent is furnished with a low-pass filter having a shunt capacitor, a series inductor for resonating with the shunt capacitor and a sampling switch. The values of the series inductor and shunt capacitance are such that the duration of one-half cycle (or any odd number of half-cycles) at the resonant frequency is an interval of time equal to the interval during which the sampling switch is closed. This permits all of the charge on the shunt capacitor of one port circuit to be transferred through the series inductance and closed switches to the shunt capacitor of the other port circuit.

It is an advantage of the aforementioned resonant transfer system that charge transfer is inherently bidirectional, i.e., the charges present on each of the shunt capacitors just before the switch is closed are interchanged when the switch is closed. This attribute, nevertheless, requires that series inductors be employed in the charge transfer path. Unfortunately, integrated circuit technology does not presently admit of the manufacture of inductances to any practicable degree.

In any physically realizable system having a transmission path of any appreciable length, a certain amount of signal attenuation will be introduced. In D. B. James et al. U.S. Pat. No. 2,936,338 issued May 10, 1960, the attenuation in each direction of transmission is overcome by the use of a respective amplifier. Such an arrangement is often referred to as a "four-wire" transmission path. The gain of the amplifier employed in each path may of course be adjusted to compensate for any loss in transmission between the interconnected ports. However, this leads to manufacturing problems. If each port is to be equipped with a pair of amplifiers, the amplifiers must have their resistance values adjusted in a fairly precise way to achieve the desired amount of gain. Providing for resistance adjustment, however, increases the cost of circuit fabrication.

In addition to conventional time division switching systems, systems are known, as for example from my U.S. Pat. No. 3,860,761 issued Jan. 14, 1975, which employ time sampling techniques in what is, basically, a space division switching system. In the system of that patent, there are multiplexed on a single digital transmission path defined for a particular call, coded representations of the call signaling and network control information and the speech signals, first in one direction and then in the other.

As the desirability of employing time division switching or time-sampling techniques has increasingly suggested itself to designers of switching equipment, the physical size of the average installation and number of telephones covered has tended to increase, thereby tending to introduce the problem of signal transmission delays. It would be desirable to provide a time division switching technique in which the effects of transmission delays could be easily overcome.

SUMMARY OF THE INVENTION

I have discovered that a four-wire time-sampled port may be achieved which does not require the use of a series resonant inductor to transfer charge to or from the shunt capacitor of the low-pass filter. Accordingly, such a port circuit may be economically fabricated on a "chip" using integrated circuit technology. Moreover, in accordance with one aspect of my discovery, the port circuit need employ only unity gain amplifiers and will, nevertheless, compensate for any reasonable degree of transmission loss or propagation delay occurring in the switched path between two interconnected ports.

In accordance with the first aspect of my discovery, I have found that the charge impressed by the telephone set on the shunt capacitor of the low-pass filter may be passively sampled during the transmit time slot instead of being physically transferred through a closed switch as in resonant transfer arrangements. Moreover, during the receive time slot, the same capacitor may be forcibly impulse-charged to a new value and that latter value need not be drained off, as by the use of clamping circuits, in anticipation of the next time slot.

In accordance with this aspect of the operation of my invention, I have discovered a new use for the shunt capacitor of a low-pass filter whereby it may be forcibly impulse driven for information transmission in the direction toward the associated telephone set and passively sampled for signals which traverse the filter in the opposite direction. In this manner, I have eliminated the need for the series inductor which was priorly required to transfer all of the sampled charge away from a given shunt capacitor before that same capacitor could be permitted to receive a new charge.

In accordance with the second aspect of my discovery, I have found it desirable to integrate the send and receive switches or gates with the circuitry for encoding the analog sample into a digital waveform for transmission, and the circuitry for receiving a digital signal and decoding it into analog form for reception by the telephone set.

According to a third aspect of my invention, which may be employed to great advantage in a time-sampled system of the aforementioned U.S. Pat. No. 3,860,761 type, I have found that the ramp signals for decoding the received digitally-encoded voice signal may be steeper, i.e., of greater instantaneous amplitude, at corresponding points of time than the slope of the ramp used for encoding the analog (voice) sample into digital form. Thus, by supplying different amplitude ramp waveforms, I have eliminated the need for amplifiers having gain adjustment and, indeed, only unity gain amplifiers need by employed. Moreover, the onset of the receive ramp waveform may be delayed from that of the nominal onset of time of the digitally encoded signal being received to compensate for any delay in the transmission path between interconnected port circuits.

BRIEF DESCRIPTION OF THE DRAWINGS

The foregoing and other objects and features of my invention may become more apparent from the ensuing detailed description and drawing in which:

FIG. 1 shows a time division port circuit together with the generators for the sending and receiving ramp signals and the transmitting and receiving clocks of an illustrative embodiment of my invention;

FIG. 2 shows the encoding and decoding ramp waveforms and the transmit and receive pulses applied to FIG. 1;

FIG. 4 shows the idealized impulse response of the low-pass filter of the illustrative port circuit.

DETAILED DESCRIPTION

Figure 3:
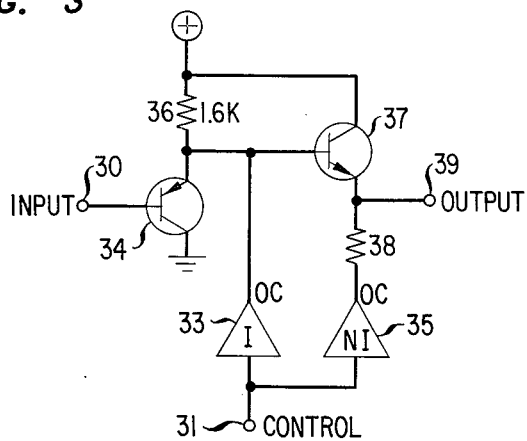
FIG. 3 shows a diagram of one form of special gated signal switch that may be employed in the time division port circuit illustrative embodiment.

A conventional telephone set 101 shown at the left-hand side of FIG. 1 is connected over the usual tip and ring conductors T, R to the primary windings 102-1, 102-2 of a conventional line transformer 102. The other end of each primary winding is connected over a respective resistor 103, 104 to the usual battery and ground supplies. The secondary winding 102-3 of line transformer 102 is connected to low-pass filter 108 having an input capacitor 105, a series inductor 106 and a shunt output capacitor 107. Advantageously, low-pass filter 108 and line transformer 102 may be fabricated in a unitary assembly, and in accordance with one aspect of my invention, the low-pass filter 108 and line transformer 102 are the only inductors required in the port circuit. Low-pass filter 108 is designed to pass the highest audio component desired to be transmitted.

The alternating voice frequency voltages impressed by telephone set 101 in the windings of transformer 102 are applied to low-pass filter 108, and, at the sampling instant, shunt capacitor 107 will have an instantaneous charge reflecting (it is, in fact, double) the instantaneous value of the speech signal from telephone set 101. Capacitor 107 of low-pass filter 108 is connected to integrated port circuit 100, and the instantaneous voltage on capacitor 107 is sampled by gated signal switch 300-3 of circuit 100. Switch 300-3 is gated on at its control terminal 31-3 under control of send strobe clockpulse 131 shown in FIG. 2 applied by send strobe clock 130 to terminal 31-3. Gated signal switch 300-3 advantageously includes emitter-followers between input terminal 30-3 and output terminal 39-3 so that it exhibits extremely high input impedance to capacitor 107 and rather low output impedance to capacitor 109. Advantageously, capacitor 109 may have a capacitance much lower in value than that of capacitor 107 to minimize its charging time and the current drive required of switch 300-3 in forcing capacitor 109 to assume the same voltage as capacitor 107. Since it will be desired that capacitor 109 shall assume the same voltage as appears on capacitor 107, gated signal switch 300-3 should exhibit substantially unit gain between its terminals 30-3 and 39-3. In an actual embodiment constructed according to my invention, capacitors 109 and 107 had values of 0.088$\mu$F and 0.001$\mu$F, respectively, and were not actually integrated within the chip comprising circuit 100 but were discrete components.

The voltage on capacitor 109 is applied to the upper input of comparator 112 which may be of any known design suitable for integration. The lower input of comparator 112 receives send ramp signal 151 supplied by send ramp generator 150. Advantageously, send ramp signal 151 may exhibit the nonlinear wave shape shown in FIG. 2 to perform signal companding, i.e. to assign a larger than proportional share of the total ramp duration to coding small signals. By allowing more of the ramp for small signals, these are provided a better noise margin than larger signals, thereby maintaining an essentially constant signal-to-noise ratio for both large and small signals. When the amplitude of the transmitting ramp signal 151 equals that of the voltage on capacitor 109, comparator 112 changes the state of its output on lead 115. Accordingly, the interval between the onset of transmitting ramp signal 151 and the change of state of lead 115 is an interval capable of representing, i.e., is a time-duration encodement of, the voltage sample on capacitor 109. Lead 115 is connected to a switching network which, advantageously, may be of the type disclosed in the aforementioned U.S. Pat. No. 3,860,761 for distribution to other port circuits (not shown) which, in turn, provide time-duration encoded samples for reception by port circuit 100.

In like fashion, the remote telephone set (not shown) and its associated port circuit, which is advantageously the same as that of FIG. 1, applies a time-duration encodement of a speech sample generated thereat to incoming lead 113 of port circuit 100. The signal appearing on lead 113 is applied to control terminal 31-1 of gated signal switch 300-1. Switch 300-1 is advantageously of similar design to that of switch 300-3, differing only in slight detail as will be explained in connection with FIG. 5 hereafter. The right-hand signal input terminal 30-1 of switch 300-1 is connected to receive ramp generator 160 which applies the receive ramp signal 161 shown in FIG. 2. Advantageously, signal 161 may be delayed by the amount $\Delta$ from the onset of the transmitting ramp signal 151. This delay $\Delta$ compensates for the delay in the transmission to terminal 31-1 of the time-duration encoded signal from the remote telephone set (not shown, but whose sending circuitry would be similar to that shown associated with lead 115). The amount of delay in a typical system may be of the order of several nanoseconds to a microsecond or so.

Further, in accordance with the illustrative embodiment of my invention, the instantaneous slope of the receive ramp signal 161 may advantageously be somewhat greater than that of the transmit ramp signal 151. Accordingly, when the duration-encoded signal on lead 113 changes state, the magnitude of the signal appearing at output terminal 39-1 of gated signal switch 300-1 will be correspondingly greater than the amplitude of the ramp signal applied to the transmitting comparator of the port circuit (not shown) at the remote end of lead 113. The greater amplitude of receive ramp signal 161 thus compensates for any loss in the transmission path from switch 300-1 leftward to telephone 101. Gated signal switch 300-1 thus applies to capacitor 110 a signal whose amplitude is a compensated decodement of the time-duration encoded signal appearing on lead 113. Advantageously, capacitor 110 may be the same size as capacitor 109, i.e., both may be much smaller than capacitor 107.

The voltage on capacitor 110 is sampled by gated signal switch 300-2 during the receive gate 141 supplied by receive strobe clock 140. Gated signal switch 300-2 may be similar in design to gated signal switch 300-1, but advantageously should be of somewhat higher power rating and exhibit even lower output impedance. Gated signal switch 300-2 samples (but does not change) the voltage on capacitor 110 and applies an equivalent voltage to capacitor 107. The output impedance of switch 300-2 is designed to be sufficiently low so that whatever the pre-existing voltage on capacitor 107, it can be changed to the value on capacitor 110 during pulse 141.

Summarizing the operation of the port circuit of FIG. 1, it is seen that the charge applied by telephone set 101 to capacitor 107 is passively voltage-sampled without being changed by gated signal switch 300-3, and a voltage corresponding thereto is applied to capacitor 109. The voltage on capacitor 109 is encoded by comparator 112 for transmission to remote telephone sets (not shown). Time-duration encoded signals from telephone sets (not shown) remote from set 101 are applied to the control terminal of gated signal switch 300-1 and an aliquot portion of the receive ramp signal 161 is passed through gated signal switch 300-1 to apply an amplitude of voltage on capacitor 110 corresponding to the time-duration encoded signal from the remote station. The voltages appearing on capacitor 110 are sampled at a repetition rate equal to twice the cutoff frequency of low-pass filter 108, and gated signal switch 300-2 applies current impulses dynamically to charge shunt capacitor 107. The voltage appearing on shunt capacitor 107 due to the impulse drive of gated signal switch 300-2 will be very low, ideally zero, as shown in FIG. 4 at integral multiples of the time interval, $\tau$, corresponding to the reciprocal of twice the cutoff frequency of the low-pass filter 108. Accordingly, one interval of time $\tau$ after gated signal switch 300-2 has forcibly impulse-charged shunt capacitor 107 to a voltage value representing the received signal appearing on lead 113, that voltage will effectively be zero so that shunt capacitor 107 will exhibit only the voltage impressed by the voice current supplied by telephone set 101 for transmission to other sets. Thus, gated signal switch 300-3 may be gated on by the send strobe clock 130 one interval of time $\tau$ after gated signal switch 300-2 is gated on by the receive strobe clock 140. The time interval $\tau$ is desired to be the reciprocal of twice the cutoff frequency of the low-pass filter because that frequency is desired to be twice the frequency of the highest component voice frequency to be transmitted.

Referring now to FIG. 2, the time relationship between the send (encoding) ramp signal 151 and the receive (decoding) ramp signal 161 is shown. At arbitrary time abscissa $T_s$, the voltage appearing on capacitor 109 is assumed to equal the instantaneous amplitude of send ramp signal 151. Comparator 112, FIG. 1, changes the state of its output lead 115 at this time to provide thereon a duration-encoded digital signal. If a remote telephone set (not shown) is assumed to be applying to lead 113 an encodement of a signal which has the same amplitude signal for reception by telephone set 101, gated signal switch 300-1 would pass to capacitor 110 an aliquot portion of receiving ramp signal 161. However, the instantaneous amplitude of receive ramp 161 is greater for corresponding intervals of time from onset than that of send ramp 151, and so, at abscissa $T_R$, the amplitude of receive ramp is greater by the amount $\alpha$. Accordingly, any attenuation in transmission is compensated by the ramp signal rather than by adjustment of amplifier gain in switch 300-1.

The gated signal switch of FIG. 3 operates in the following manner. Let it be initially assumed that no signal is applied to input terminal 30 and that no strobe signal is applied to control terminal 31. Source 130 or 140, as the case may be, which may be connected to terminal 31, normally maintains terminal 31 in the high signal state (see FIG. 2). With terminal 31 in the high signal state, the emitter of transistor 34 is kept low by inverter 33, and transistor 34 is off. Likewise, the emitter of transistor 37 is kept high by noninverting amplifier 35, and transistor 37 is kept off. When the send or receive strobe clock pulse 131 or 141 is applied to control terminal 31, both transistors 34 and 37 are turned on. Transistors 34 and 37 are effectively connected as cascaded emitter-follower stages and thus present high input impedance to input terminal 31 and the low driving point or output impedance to output terminal 39. Advantageously, the circuit of FIG. 3 may provide near-unity voltage gain between the input terminal 30 and output terminal 39.

Figure 5:
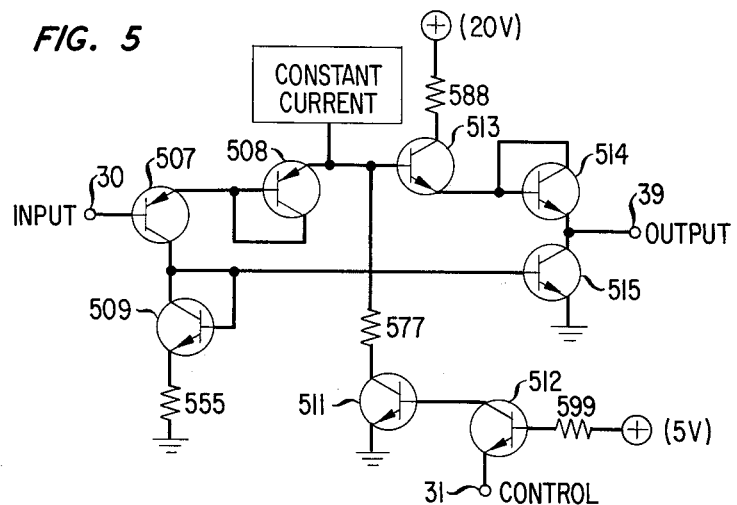
FIGS. 5 and 6 show details of two alternative types of gated signal switches that may be employed in the port circuit of the illustrative embodiment.

Referring now to FIG. 5, there is shown an illustrative embodiment of a form of gated signal switch alternative to that of FIG. 3 which may be employed to particular advantage in implementing gated signal switch 300-1 of FIG. 1. The emitter of transistor 508 and the collector of transistor 513 are supplied from a constant current source. The circuit is turned on when the time-duration encoded signal applied to control terminal 31 goes low and the receiving ramp signal is applied to input terminal 30. The gate is turned off when the signal applied to control terminal 31 goes high, turning transistor 512 off, and turning transistor 511 on. When transistor 511 is on, it carries substantially all of the current from the constant current source. For this purpose, resistor 577 is selected so that, when it carries the entire value of constant current supplied, its voltage drop will be sufficient to back-bias transistors 508 and 513.

With the gate on (transistor 511 cut off) and the voltage at terminal 30 assumed to be equal to the voltage on output terminal 39, the constant current supplied to the junction of transistors 508 and 513 divides between the left-hand branch including diode-connected transistor 508, transistor 507 and transistors 509 and 515 in parallel, and the right-hand branch including transistor 513, diode-connected transistor 514 and transistor 515. The voltage at the emitter of diode-connected transistor 508 will be two diode drops more positive than the input voltage at terminal 30 (at the base of transistor 507), while the output voltage at terminal 39 will be two diode drops more negative than the potential at the emitter of transistor 508. Accordingly, the output voltage nearly equals the input voltage, and no current will be delivered out of terminal 39. The amount of DC offset voltage between terminals 30 and 39 may be minimized by using smaller areas in the integrated chip for transistors 507 and 508 than for transistors 513 and 514.

Considering the left-hand branch current, the collector current of transistor 507 divides between transistor 509 (shown diode-connected) and the base-emitter path of transistor 515. The ratio of division is determined by the size of resistor 555, the voltage drop through which, together with the diode drop through transistor 509, controls the base-emitter bias of transistor 515. In the illustrative embodiment, the constant current source supplied 333μA to the junction of the base of transistor 513 and the emitter of transistor 508, with 300μA flowing in the aforementioned left-hand branch, and approximately 33μA flowing into the base of transistor 513. Resistor 555 was selected to give a steady state current of approximately 4mA through the collector-emitter junction of transistor 513.

Assuming that the ramp signal applied to input terminal 30 is more positive than the voltage on capacitor 110, which is assumed to be connected at output terminal 39, current can be delivered out of terminal 39 only if the emitter current of transistor 513 (which is the same as the emitter current of diode-connected transistor 514) is greater than the collector current of transistor 515. Since the voltage at the base of transistor 513 will be two diode drops more positive than the ramp voltage at input terminal 30, it will tend to increase the forward bias on transistors 513 and 514 and to decrease the forward bias on transistors 507 and 508. The decrease in forward bias on transistor 507 reduces the amount of current base drive that transistor 507 supplies to transistor 515. This reduces the collector current through transistor 515, and means that the emitter current of transistor 514 will be diverted away from transistor 515 and directed out of output terminal 39 to the load. Thus, a compound effect of (a) increased output current due to the voltage difference between terminals 30 and 39 increasing the drive current for transistor 513, and (b) increased output current due to turning off the current diverting path through transistor 515, causes a rapid increase in the load current delivered at output terminal 39.

If it now be assumed that the signal applied to input terminal 30 is instantaneously more negative than the voltage on capacitor 110 (which is assumed to be connected to output terminal 39), the emitter of diode-connected transistor 508 will be more negative by the instantaneous amplitude of that signal. The negative voltage increment decreases the forward bias of transistor 513 which is reflected in reduced emitter current out of transistor 513. The portion of the constant current input which can no longer flow through transistor 513 is diverted so that it now flows through diode-connected transistor 508 and the emitter-collector path of transistor 507. The increased collector current of transistor 507 increases the base current drive of transistor 515. Accordingly, the emitter current of transistor 513 has been reduced at the same time that an increased fraction thereof is diverted away from output terminal 39 through shunting transistor 515. This compound effect quickly reduces the charge on capacitor 110 (assumed to be connected at output terminal 39).

It was mentioned above, in connection with the description of FIG. 1, that gated signal switches 300-1 and 300-3 are essentially similar in design. The circuit of FIG. 5 may be employed in implementing gated signal switch 300-1 simply by replacing emitter resistor 555 of transistor 509 with a short circuit. This reduces the steady state base bias for transistor 515 which therefore reduces transistor 515 emitter current. This reduction in current in the "right-hand" transistor path is an advantageous design economy that may be obtained because of the different duty cycles to which gated signal switches 300-1 and 300-3 are subjected. It will be recalled that gated signal switch 300-3 merely samples the voltage appearing on shunt capacitor 107 and applies that voltage to capacitor 109 during sampling pulse 131 whose duration may be of the order of 6.25 μ seconds. On the other hand, gated signal switch 300-1 charges capacitor 110 throughout an aliquot portion of the interval τ which may be an appreciable fraction of 62.5 μ seconds. Since gated signal switch 300-1 must "follow" the ramp signal 161 during a long time interval, whereas gated signal switch 300-3 merely "samples" a voltage during a short interval of time, gated signal switch 300-3 need not provide as much drive current to its load (capacitor 109), and hence the steady-state current in its "right-hand" transistor path may be lower.

Figure 6:
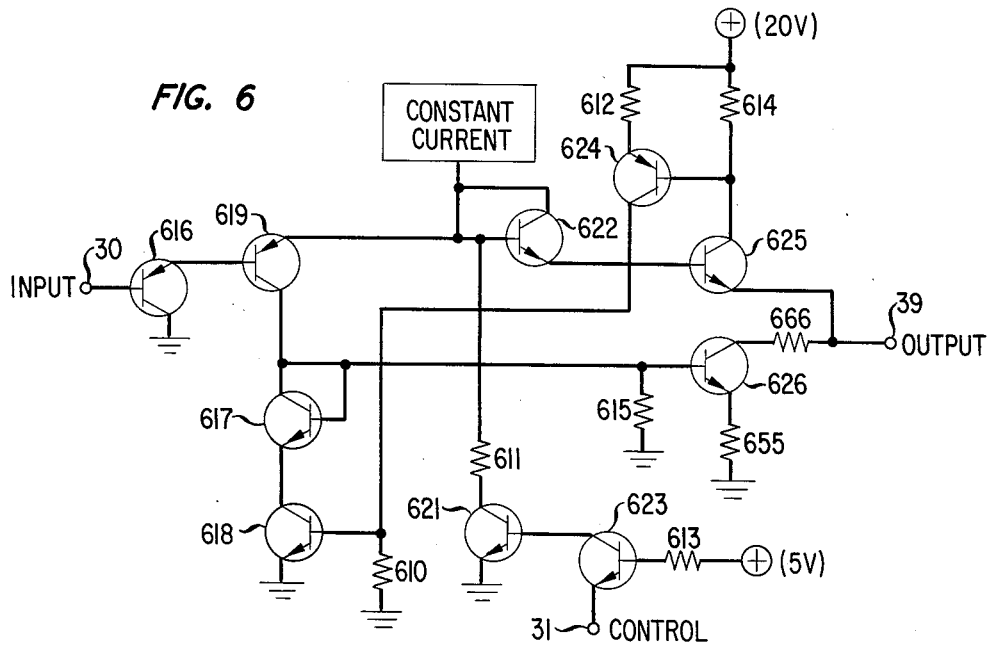

Referring now to FIG. 6, there is shown a still further increased current drive circuit suitable for implementing gated signal switch 300-2. In this figure, transistors 621 and 623 and their associated resistors operate essentially in the same manner as transistors 511 and 512 of FIG. 5. The requirements imposed upon gated signal switch 300-2 are rather more severe than those required of gated signal switches 300-1 or 300-3. Gated signal switch 300-2 will be turned on only during the receive strobe clock 141 which is approximately 10 percent of the duration of time interval τ. The input impedance of terminal 30 of FIG. 6 must be sufficiently high that it will not cause any appreciable change on the voltage of capacitor 110 which is assumed to be connected thereto (see FIG. 1). Nevertheless, the current drive out of terminal 39 must force capacitor 107 to that voltage during the interval of strobe pulse 141. Accordingly, the output or driving point impedance of output terminal 39 must be extremely low.

Let it be assumed that the voltages on capacitors 110 and 107 are equal when receive strobe clock 140 applies pulse 141 to control terminal 31. Under these circumstances, the circuit should deliver no load current out of terminal 39. The voltage drop produced by the collector current of transistor 625 flowing through resistor 614 during this no load, or steady state, condition is such as to forward-bias transistor 624 which conducts and provides sufficient current through resistor 610 to turn on transistor 618. Transistor 618 thus takes the place of resistor 555 of FIG. 5 with diode-connected transistor 617 performing a similar function to diode-connected transistor 509. However, unlike resistor 555, transistor 618 is controlled by the current in the "right-hand" branch.

The constant current source of FIG. 6, in an illustrative embodiment, is assumed to provide a 1mA input that is divided between the base of transistor 622 and the emitter of transistor 619. The collector current of transistor 619 divides between the path including diode-connected transistor 617 in series with the collector emitter path of transistor 618, on the one hand, and the base drive for transistor 626 on the other. The emitter resistor 655 of transistor 626 establishes the steady state collector current of transistor 626 which, in an illustrative embodiment was 10mA, the same as the emitter current of transistor 625 at steady state. Transistor 619 in FIG. 6 is not diode-connected in the manner of transistor 508 of FIG. 5, thereby greatly reducing the emitter current of, and hence the base drive required for, input transistor 616.

Now let it be assumed that the voltage on capacitor 110 (assumed to be connected to input terminal 30 of FIG. 6) is more positive when pulse 141 is applied to control terminal 31 than the voltage on capacitor 107

(assumed to be connected to output terminal 39). The base of transistor 622 will be two diode drops more positive than the output voltage on terminal 39, increasing the forward bias of transistor 625 and decreasing the forward bias of transistor 619. A corresponding portion of the constant current input will be diverted away from transistor 619 and through diode-connected transistor 622 and accordingly, into the base of transistor 625. The increased drive accorded to transistor 625 will be reflected in an increased current drop in resistor 614. This causes an increased collector current in transistor 624 which increases the base drive for transistor 618. Transistor 618 thus diverts more of any collector current that may still be supplied by transistor 619 away from the base of transistor 626. With transistor 626 conducting less or cut off, more of the emitter current of transistor 625 is forced out of terminal 39 to the load.

If it now be assumed that voltage applied to terminal 30 of FIG. 6 is more negative than the voltage appearing on terminal 39, the base current drive to transistor 625 is reduced, causing less transistor 625 emitter current to flow to the load and increasing the base drive for transistor 619. Reducing the collector current of transistor 625 reduces the base drive to transistor 624 and, in turn, to transistor 618. The increased base drive to transistor 619 causes it to deliver, at its collector, an increased base current drive to transistor 626, and less of the base drive is siphoned off by transistor 618. Accordingly, transistor 626 will divert substantially all of the emitter current of transistor 625 away from terminal 39, as well as "sinking" the voltage on shunt capacitor 107 (which is assumed to be connected to terminal 39) to the same voltage as that which has been applied at input terminal 30.

Accordingly, I have described a time division line port which advantageously may be completely integrated because it does not require any series inductor to resonate with the shunt capacitance of the low-pass filter. Further, all of the amplifiers employed within my gated signal switches may be near-unity gain, emitter-coupled stages requiring no precise resistors. Any required amplification to compensate for transmission loss or delay is achieved by supplying the gates with a receiving ramp waveform which is steeper than, and whose onset is delayed from, that of the sending ramp. It should be apparent that the send and receive ramp generators 150 and 160 may supply a number of port circuits 100 so that the cost of the equipment for providing the waveform of FIG. 2 may be amortized over the entire switching network and is not, as would be the case of individually adjusted amplifiers, required to be expended on a per port basis. It will be apparent that, although bipolar transistors have been disclosed, equivalent circuitry may be constructed using fully integrated unipolar transistors. Further, the sampling and transmission switch circuits may be realized otherwise than is illustrated herein. The passive sampling switch 300-3 need not be a high input impedance, low output impedance design; a simpler bilateral switch type circuit will suffice if capacitor 109 is somewhat smaller than capacitor 107. Any modest loss from use of a bilateral switch for 300-3 can be compensated by making receiving ramp 161 slightly larger. It should also be appreciated that, although duration-coded signals are shown on conductors 115 and 113, other forms of digital encoding, such as pulse code modulation, may also be used. Numerous other modifications may be made by those skilled in the art without, however, departing from the principles of my invention.

What is claimed is:

1. In a port circuit for a time-sampled switching system having a low-pass filter, the combination comprising:
 a first high input impedance transmission path including means for periodically passively sampling voltages transmitted through said filter in one direction; and
 a second transmission path having low output impedance coupled to said filter for applying thereto discrete current impulses at intervals substantially equal to the reciprocal of twice the cut-off frequency of said filter.

2. In a port circuit for a time-sampled switching system having a low-pass filter including a final shunt capacitor, the combination comprising:
 a first transmission path presenting a high input impedance to time varying signals traversing said filter in a first direction, said first path including a sampling capacitor and means for periodically applying an amplitude fraction of said signals to said sampling capacitor; and
 a second transmission path periodically presenting a low driving point impedance to said filter, said second path including means for periodically impulse charging said final shunt capacitor of said filter to force signals therethrough in a direction opposite to said first direction.

3. An integrated solid state electronic circuit comprising:
 a bidirectional transmission terminal and a first and second unidirectional transmission terminal, a send and a receive strobe clock terminal and a send and a receive ramp terminal;
 a first, second and third gated signal switch and a signal comparator each having an input, an output and a control terminal, the input terminal of said first and the output terminal of said second gated signal switch being connected together at said bidirectional transmission terminal;
 means connecting the output terminal of said first gated signal switch to the input terminal of said comparator;
 means connecting the output terminal of said comparator to said first unidirectional transmission terminal;
 means connecting the control terminal of said comparator to said send ramp terminal;
 means connecting the control terminal of said third gated signal switch to said second unidirectional transmission terminal;
 means connecting the input terminal of said third gated signal switch to said receive ramp terminal;
 means connecting the output terminal of said third gated signal switch to the input terminal of said second gated input switch; and
 means respectively connecting the control terminals of said first and said second gated signal switches to said send and to said receive strobe clock terminals.

4. In combination with the integrated solid state electronic circuit of claim 3 a first sampling capacitor connected at the output terminal of said first gated signal switch, and a said second sampling capacitor connected at the input terminal of said second gated signal switch.

5. In combination with the circuit as defined in claim 4, a port circuit having a low-pass filter including a final shunt capacitor connected to said bidirectional transmission terminal.

6. The invention of claim 5 wherein said first sampling capacitor is substantially smaller than said final shunt capacitor of said low-pass filter.

7. In a time sampled switching system including a port circuit having a bidirectional transmission terminal connected to a low-pass filter and a pair of unidirectional transmission terminals, the combination comprising:
   a first transmission path including a gated signal switch interposed between said bidirectional terminal and a first of said unidirectional terminals, said first transmission path including a gated signal switch, a first sampling capacitor and a comparator;
   a second transmission path interposed between said bidirectional terminal and the second of unidirectional terminals, said second transmission path including a pair of serially-connected gated signal switches and a second sampling capacitor in shunt with the input of one and the output of the other of the gated signal switches in said second path.

8. The invention of claim 7 further comprising
   means for applying a send ramp waveform to said comparator, and
   means for applying a receive ramp waveform to one of the gated signal switches in said second transmission path.

9. The combination of claim 8 wherein said means for applying said receive ramp waveform to said gated signal switch applies a waveform having a steeper amplitude-per-unit-time slope than the slope of the waveform applied by said means for applying said send ramp waveform to said comparator.

10. The invention of claim 9 wherein the onset of said receive ramp waveform applied to said gated signal switch is delayed by a predetermined interval of time from the onset of the transmit ramp waveform applied to said comparator.

11. In a time sampled switching system including a port circuit having a bidirectional transmission terminal connected to a low-pass filter including a final shunt capacitor, the combination comprising:
   a first and a second sampling capacitor,
   means for sampling the voltage on said first sampling capacitor and for applying to said final shunt capacitor a current impulse sufficient to bring the voltage thereon to that of said first sampling capacitor, and
   means thereafter operative following a delay interval equal to an odd multiple of half cycles measured at the cutoff frequency of said filter for sampling the voltage on said final shunt capacitor and for applying a corresponding voltage to said second sampling capacitor.

12. The invention of claim 11 further comprising a current source;
   said means for sampling said voltage on said first capacitor and for applying said current impulse to said final shunt capacitor including means for charging said shunt capacitor from said current source.

13. The invention of claim 12 further comprising
   a source of ramp signals;
   a pair of unidirectional transmission terminals;
   means for receiving a duration-encoded signal on the first of said terminals and for applying a charge to said first sampling capacitor proportional to the duration of said signal; and
   means for comparing the voltage on said second sampling capacitor with said ramp signal for applying a duration-coded signal to the second of said unidirectional terminals corresponding to said second capacitor voltage.

* * * * *